(12) United States Patent
Fraenkel (10) Patent No.: US 7,948,107 B2
(45) Date of Patent: May 24, 2011

(54) CONVERSION OF ENERGY IN WAVES AND IN TIDAL FLOW

(75) Inventor: Peter L. Fraenkel, London (GB)

(73) Assignee: Marine Current Turbines Limited, Bristol (GB)

( * ) Notice: Subject to any disclaimer, the term of this patent is extended or adjusted under 35 U.S.C. 154(b) by 388 days.

(21) Appl. No.: 12/089,318

(22) PCT Filed: Oct. 18, 2006

(86) PCT No.: PCT/GB2006/003852
§ 371 (c)(1),
(2), (4) Date: Sep. 18, 2008

(87) PCT Pub. No.: WO2007/045853
PCT Pub. Date: Apr. 26, 2007

(65) Prior Publication Data
US 2009/0121487 A1    May 14, 2009

(30) Foreign Application Priority Data

Oct. 19, 2005  (GB) .................................. 0521356.6

(51) Int. Cl.
*F03B 13/00*  (2006.01)
(52) U.S. Cl. ............... 290/54; 290/53; 60/501; 417/330
(58) Field of Classification Search .............. 290/42–43, 290/53–54; 60/398, 495–498, 500–502, 60/505, 698; 417/330–333; 415/7; 416/85
See application file for complete search history.

(56) References Cited

U.S. PATENT DOCUMENTS

| | | | | |
|---|---|---|---|---|
| 3,746,875 A | * | 7/1973 | Donatelli | 290/42 |
| 4,392,060 A | | 7/1983 | Ivy | 290/53 |
| 4,661,716 A | | 4/1987 | Chu | 290/53 |
| 4,803,839 A | | 2/1989 | Russo, III | 60/501 |
| 5,105,094 A | | 4/1992 | Parker | 290/53 |
| 5,929,531 A | | 7/1999 | Lagno | 290/53 |
| 6,208,035 B1 | | 3/2001 | Kao | 290/42 |
| 6,681,572 B2 | | 1/2004 | Flory | 60/507 |
| 6,711,897 B2 | | 3/2004 | Lee | 60/507 |
| 7,476,986 B1 | | 1/2009 | Del Principe | 290/53 |

FOREIGN PATENT DOCUMENTS

| | | |
|---|---|---|
| DE | 26 48 318 A1 | 4/1978 |
| FR | 2 369 440 A1 | 5/1978 |
| GB | 2 311 566 A | 1/1997 |
| GB | 2 365 385 A | 2/2002 |
| JP | 3-189372 | 8/1991 |
| JP | 8-35479 | 2/1996 |
| JP | 2005-120959 | 5/2005 |

* cited by examiner

*Primary Examiner* — Michael C Zarroli
(74) *Attorney, Agent, or Firm* — Brinks Hofer Gilson & Lione (57) ABSTRACT

An energy conversion system comprising a support structure upstanding within a volume of water subject to the occurrence of both wave motion and tidal flow, a first apparatus mounted from the support for deriving usable power from the tidal flow, and a second apparatus operationally supported relative to the support structure for deriving usable power from the occurrence of wave motion independently from that derived from tidal flows and power transfer apparatus for facilitating the transfer of such usable powers to a land based location, or for making some alternative use of such power elsewhere.

12 Claims, 5 Drawing Sheets

CONVERSION OF ENERGY IN WAVES AND IN TIDAL FLOW

BACKGROUND OF THE INVENTION

This invention relates to turbines and to other such devices capable of interacting with a flow of a liquid medium such as a flow of water in such a manner as to transfer energy from the liquid medium/water to means for utilising the transferred energy such as a mechanically driven device.

It is known to use turbines and rotating machinery for the purpose of extracting energy from moving water currents, for example such as has been disclosed in our British Patents GB 2311566 "Column Mounted Water Current Turbine", GB 2348250 "Pile Mounted Vertically Displaceable Water Turbine", and in GB 2347976 "Variable Pitch water turbine".

In these patents we have disclosed constructions pertaining to water driveable turbines where one or preferably two or more turbines and associated rotors may be arranged such that they are supported on a structure embedded in, or carried on a foundation set, in the sea, river or estuary bed.

We have also disclosed similar relevant information in foreign patents derived from the above mentioned British patents, including among others, U.S. Pat. No. 6,652,221, European EP 1183463, New Zealand NZ 514274 and Australian AU 766741, all entitled "Water Current Turbine Sleeve Mounting". There are also a few examples of such prior art from other sources.

It is also known how to construct devices capable of absorbing energy from passing waves. Said devices may use several physical principles in that they may either react to surface movements of the waves, for example: by displacing air in a chamber engaged with the surface of the sea through a turbine, such a device being commonly known as an "oscillating water column", by reacting wave induced buoyancy forces in some way such as, for example, to generate high pressure in a hydraulic ram which in turn can be utilised to power a hydraulic motor capable of driving a generator or by making use of static pressure variations arising from the varying height of the water surface caused by passing waves.

Some wave power devices can use resonance effects as well as in some cases buoyancy forces arising in heave caused by passing waves to enhance their efficiency at extracting energy from waves.

It should be noted in practice said water driveable and wave driveable devices will generally be connected mechanically, hydraulically or pneumatically to a power train capable of absorbing the available energy from the relatively slow movement of the device in response to slow moving water movements, and converting such energy to a more usable form such as electricity or pressurised fluid which may be readily respectively transferred by way of cables or pipes to a point of application where it may usefully be exploited.

Said power train may typically consist of a geared speed increaser coupled to an electrical generator or to a hydraulic pump or in some cases the rotor may be directly coupled without recourse to a mechanical speed-increaser to a specially designed and matched slow-speed generator or pump.

OBJECT OF THE INVENTION

It is an object of the present invention to enhance the possibility of utilising energy inherent in moving water whether tidal or wave motion.

STATEMENTS OF THE INVENTION

Broadly according to a first aspect of the invention there is provided an energy conversion installation including means for converting into usable energy the energy derivable from a continuous or quasi continuous movement of water currents relative to the installation, and also means for converting into usable energy the energy derivable from wavelike/orbital water movements relative to the installation.

Broadly according to a further aspect of the invention there is provided an energy conversion system incorporating power generation installation for utilising power generated from a volume of non-static water, the installation including a support structure upstanding within a volume of water subject to the occurrence of both wave motion and tidal flow, means mounted from the support structure for deriving usable power from the tidal flow, and means operationally supported relative to the support structure for deriving usable power from the occurrence of wave motion independently from that derived from tidal flows and means for facilitating the transfer of such usable powers to a land based location, or for making some alternative use of such power elsewhere.

Preferably the energy conversion system includes a turbine installation or other such installation immersible in water and adapted to be driven by energy derived from a water flow passing the turbine installation, and means for deriving energy from wavelike movements of the water provided on the supporting structure.

Preferably the system is arranged to function either from the flow of water currents when waves are either not present or too small to be usable, or from the energy of passing waves at times such as slack tide when currents are not available, or from a combination of both sources of energy simultaneously when both are available. In a particular arrangement one or more turbines is or are arranged to be driven by passing tidal or marine currents are mounted for operation on a support structure located in a body of water, and wherein the support structure additionally carries a device/means capable of extracting wave energy from wave motion present in water passing the support structure.

In a preferred construction the means for extracting wave energy is housed within the support structure.

In a further construction a first means for extracting energy from wave motion is located internally of the support structure and a second such device is located externally of the support structure.

Preferably said one or more turbines are mounted to said support in such a manner that each turbine can drive at least one generator, pump, compressor or other means of utilising power derived by the associated turbine from the passing water current.

In a preferred arrangement said one or more turbines are arranged to be 'lengthways displaceable vertically or near vertically relative to their supporting structures whereby said one or more turbines can be displaced between a submerged operating and a position in which at which or they project above the surface of the body of water.

In a still further construction the support structure includes a hollow column, and wherein the wave responsive means includes a resiliently loaded member lengthways displaceable relative to the hollow column, and wherein the hollow column is adapted to allow entry therein of water serving to displace the member in accordance with wave motion in the vicinity of the hollow column. Preferably the resiliently loaded member carries means for supporting means for deriving energy from the wave induced movements of the resiliently loaded member.

In a further preferred construction the support structure comprises a hollow column and wherein a means for deriving energy from movements lengthways of the hollow column is mounted to a resiliently loaded elongate support member connecting with a diaphragm connected with the column in such manner that the diaphragm displaces relative to the hollow column in accordance with wave motion in the vicinity of the hollow column.

Preferably the means for extracting wave energy is located externally of the support structure.

In a particular construction the means for extracting wave energy comprises a buoyant member externally surrounding a length of a column like support structure in such manner as to be lengthways displaceable of said length in accordance with the motion of passing waves and means for converting said movement into usable energy.

Thus in particular the present invention is concerned with the use of turbines and similarly moving devices capable of extracting kinetic energy inherent in water involving both water flow and wave like separately or simultaneously therefrom for the purposes of utilising such energy to produce either electricity, shaft power or for pumping water for a required useful purpose Preferably said devices can be constructed to function either from the flow of water currents when waves are either not present or too small to be usable, or from the energy of passing waves at times such as slack tide when currents are not available, or from a combination of both sources of energy simultaneously when both are available.

In a preferred arrangement/installation one or more turbines arranged to be driven by passing tidal or marine currents are mounted for operation on a support structure in a body of water, and wherein the support structure additionally carries a device/means capable of extracting energy from wave passing the support structure.

In accordance with a still further arrangement a first device for extracting energy from wave motion is located internally of the support structure and a second such device is located externally of the support structure.

It will be understood that each device for extracting energy from wave motion is/are arranged to drive a generator or generators, pumps, compressors or other means of applying the power they can extract from the passing current for some useful purpose.

A supplementary feature of this invention is that the aforementioned turbine rotor (or rotors) and its (their) associated power train(s) can in certain embodiments of this invention be raised up the structure that holds them in place, to project above sea level such that they are more readily accessible from above the surface to facilitate maintenance and repair operations.

A preferred embodiment of this invention is to combine a wave energy extraction device (or devices) with the tidal turbine concept we have previously described in our British Patent GB 2311566 B and also in our British Patent Application 2348250. These prior inventions have the turbine rotor (or rotors) mounted on a monopile support structure that is installed in a socket drilled into the seabed and the upper end of said support monopile emerges above the surface of the flowing water current. An alternative is to use a support structure that simply rests on the seabed and is sufficiently massive to be stable due to its weight (a gravity structure). When this invention is applied to this method for extracting kinetic energy from currents then it becomes possible to supplement the energy captured from the currents with energy captured from passing waves.

BRIEF DESCRIPTION OF THE DRAWINGS

For a better understanding of the invention and to show how to carry the same into effect reference will now be made to the accompanying drawings in which:—

DETAILED DESCRIPTION OF THE DRAWINGS

Figure 1:
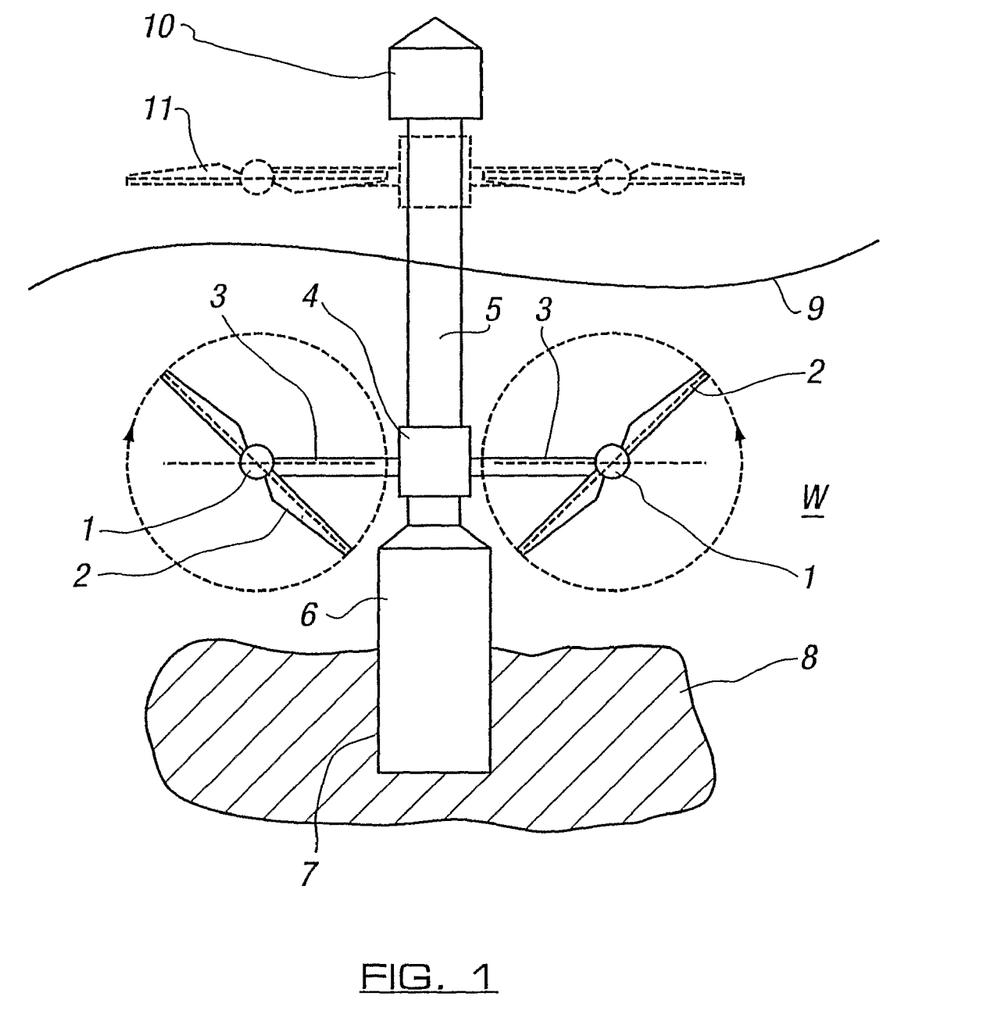
FIG. 1 schematically illustrates a known arrangement/installation involving a pair of turbines capable solely of extracting energy from passing currents.

Referring now to FIG. 1 a pair of turbines 1 having rotors 2 are carried by support arms 3 mounted to either side of a support sleeve arrangement 4, which is axially displaceable length ways of a hollow monopile structure 5 upstanding from a support base 6 embedded in a socket 7 drilled in the bed 8 of a volume of moving water W such as sea water or other tidal flow water having a surface represented by the wavy line 9.

The installation incorporates means for facilitating the transfer of such usable powers to a land based location, or for making some alternative use of such power elsewhere. In the Figures this means 10 is very schematically represented by the box-like structure located at the top of the support structure 5.

The mounting of the turbines 1 and their associated rotors 2 are thus such that the turbine rotors 2 are operationally aligned normal to the direction of flow of the current within the volume of moving water.

It will be appreciated that as shown in the FIG. 1 the direction of the water flow can be regarded as being perpendicular to the plane of the paper on which Figure is provided and viewed.

Since most tidal flows are bi-directional (ebb and flood tides) the rotors 2 may address the flow from either direction by using pitch control as disclosed in our earlier British Patent GB 2347976 "Variable Pitch Water Turbine" and its corresponding foreign derivatives. Such variation of the positioning of the rotors can be achieved by other means such as providing a facility for enabling yawing of the rotors 2 about either a horizontal or a vertical axis.

The FIG. 1 also shows in dashed lines 11 said turbine rotors (with their accompanying power train, not separately illustrated in the Figure, the power train will most generally including a speed-increasing gearbox and generator) can be raised up the monopile support structure 5 until they are located above the surface 9 of the sea by displacement of the support sleeve arrangement 4 lengthways of the monopile structure 5 by appropriate sleeve hoisting means such as is disclosed in the aforementioned British Patent No GB 2311566. It will be appreciated that the turbines and associated power trains would be raised to the level above the water surface for the purposes of maintenance thereupon or replacement thereof.

Although an embodiment as shown in FIG. 1 incorporates two turbines 1 and associated rotors 2 mounted one to either side of a single monopile structure 5, any number of rotors may be used and they may be supported from more than one monopile (e.g., two (or more) monopile structures bridged by a cross arm (or arms) carrying a plurality of turbines is a possible embodiment).

FIGS. 2 to 5 schematically illustrate the combination of means for extracting energy from wave motion and a turbine installation such as generally shown in FIG. 1. In these FIGS. 2 to 5 those features disclosed in FIG. 1 will be identified by the same reference numerals.

Figure 2:
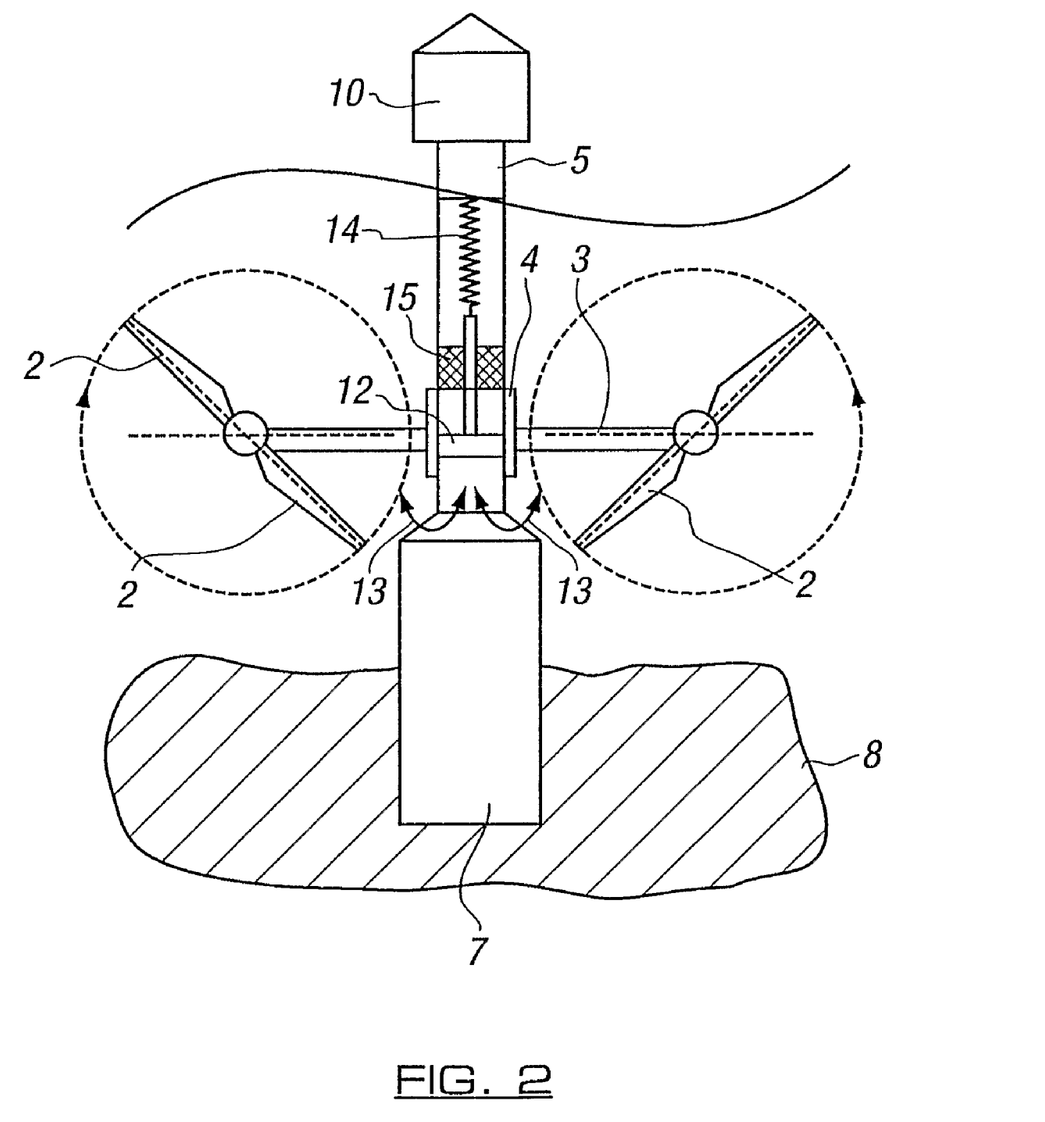
FIG. 2 schematically illustrates a first embodiment of a proposal for extracting energy from wave motion associated with a volume of water when combined with an installation/arrangement as represented by FIG. 1.

Referring now to FIG. 2 a turbine 1 and rotor 2 installation of similar construction to that of FIG. 1 is carried by the sleeve structure 4 that is lengthways displaceable relative to the hollow support monopile structure 5 whose lower end connects with the base structure 6 embedded in the seabed 8.

In the embodiment of FIG. 2, a piston like member 12 is installed within the hollow supporting monopile structure 5.

The hollow monopile or other structure 1 is provided with an array of openings 13 positioned adjacent the connection between the monopile structure 5 and the support base 6 and of such dimensions that the interior of the monopile structure 5 is water filled in such a way that this water can interact with static pressure variations caused by passing waves through the openings 13. It will be understood that the structure 5 is very securely mounted to its base 6. The apparent separation indicated in FIG. 2 does not exist. In practice the mode of illustration and arises from the need to illustrate the openings 13 with clarity.

By suspending the piston like member 12 from a spring, 14 (which may be a physical spring, elastomeric material or trapped air or any other means of obtaining a resilient connection with the support monopile structure 5) the piston like member 12 can be arranged designed to have a natural frequency similar to those of the passing waves whereby by tuning the vertical displacement of the piston like member 12 with that of the waves an amplification of the wave motion effects on the piston-like member 12 may be obtained.

In the embodiment of FIG. 2 usable energy may be derived from movements of the piston like member 12 arising from the water wave motion by means of electrical windings 15 through which, for example, permanent magnets (not shown) attached to the piston like member 12 move thereby producing electrical output currents.

It will be appreciated that other means of extracting a proportion of the energy of motion of the piston like member may be used, such as a pump or compressor or a mechanical linkage to transmit the energy to an electrical generator located preferably above sea level at the top of the supporting monopile structure.

Figure 3:
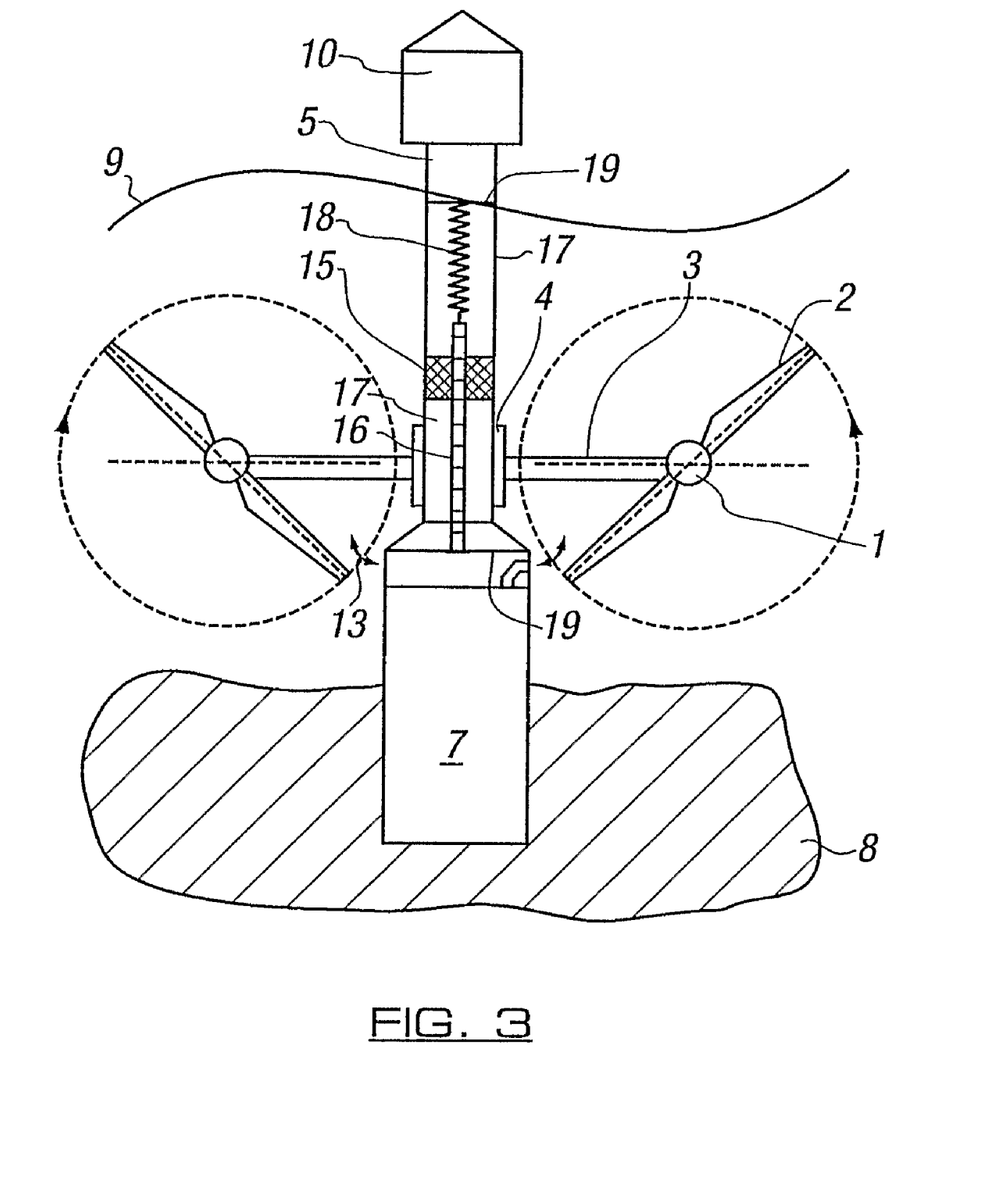
FIG. 3 schematically illustrates a second embodiment of a proposal for extracting energy from wave motion associated with a volume of water when combined with an installation/arrangement as represented by FIG. 1.

Referring to FIG. 3 this FIG. 3 shows an alternative embodiment similar in principle to that shown in FIG. 2. However in the FIG. 3 embodiment the piston like member is replaced by a resiliently loaded armature 16 supported by a resilient mechanism 17 such as a spring 18 and attached to a diaphragm 19.

In practice, the resilient mechanism 17 can be a physical metal spring as is diagrammatically illustrated or it might be the effect of pressurised air or other gas trapped in the space enclosed by the diaphragm 19. The diaphragm 19 is influenced by static pressure changes in the water arising from the displacements of the passing waves that are transmitted through the openings 13 in the supporting monopile structure 5 and this tends to drive the armature 16 in a reciprocating motion which may be tuned to resonate (or approximately resonate) with the frequency of passing waves. As in FIG. 2, the armature 16 may carry magnets to interact with the windings 15 and thereby generate electricity, or it may drive other means for exporting the extracted proportion of its kinetic energy.

As so far discussed it will be noted that the arrangements for utilising the wave motion are located internally of the hollow support monopile structure 5.

Figure 4:
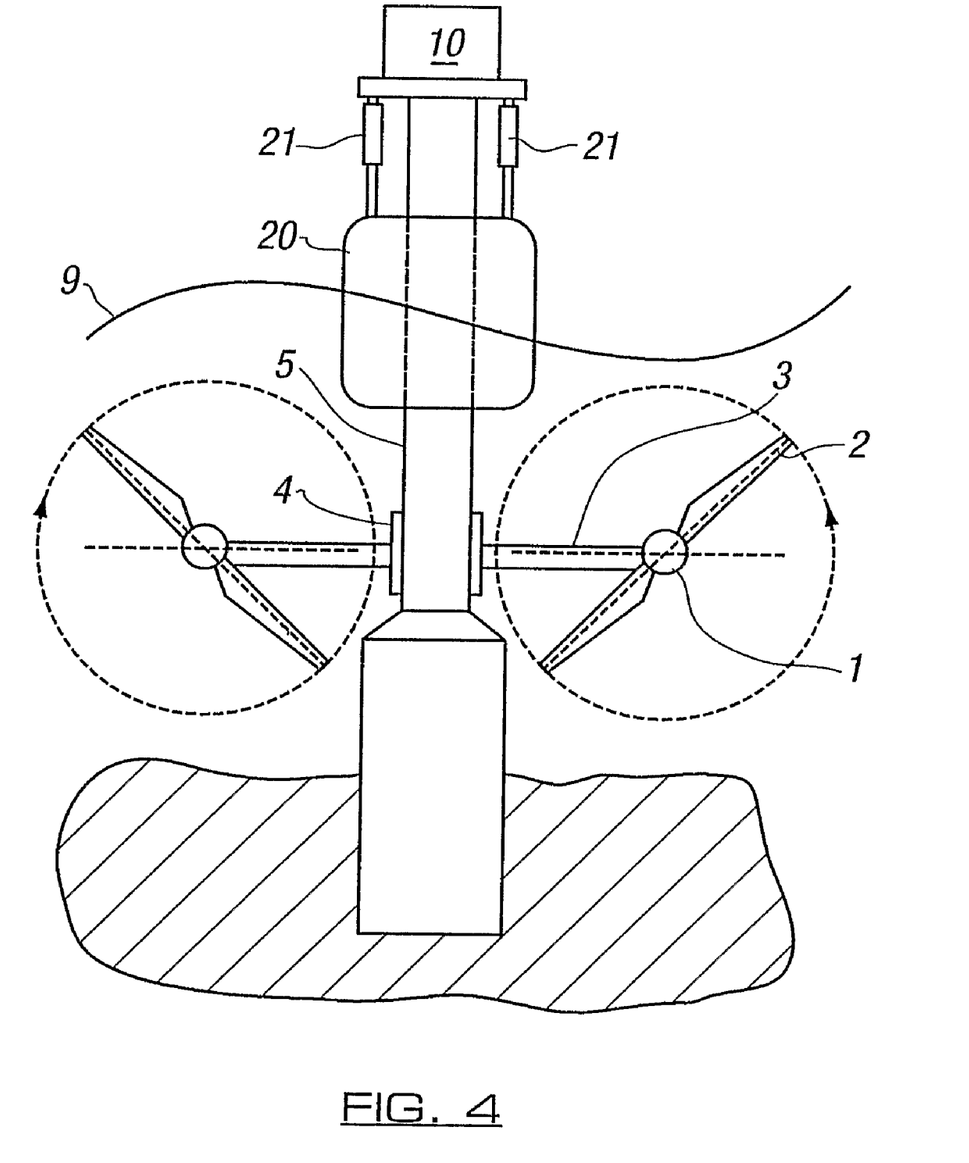
FIG. 4 schematically illustrates a third embodiment of a proposal for extracting energy from wave motion associated with a volume of water when combined with an installation/arrangement as represented by FIG. 1.
Figure 5:
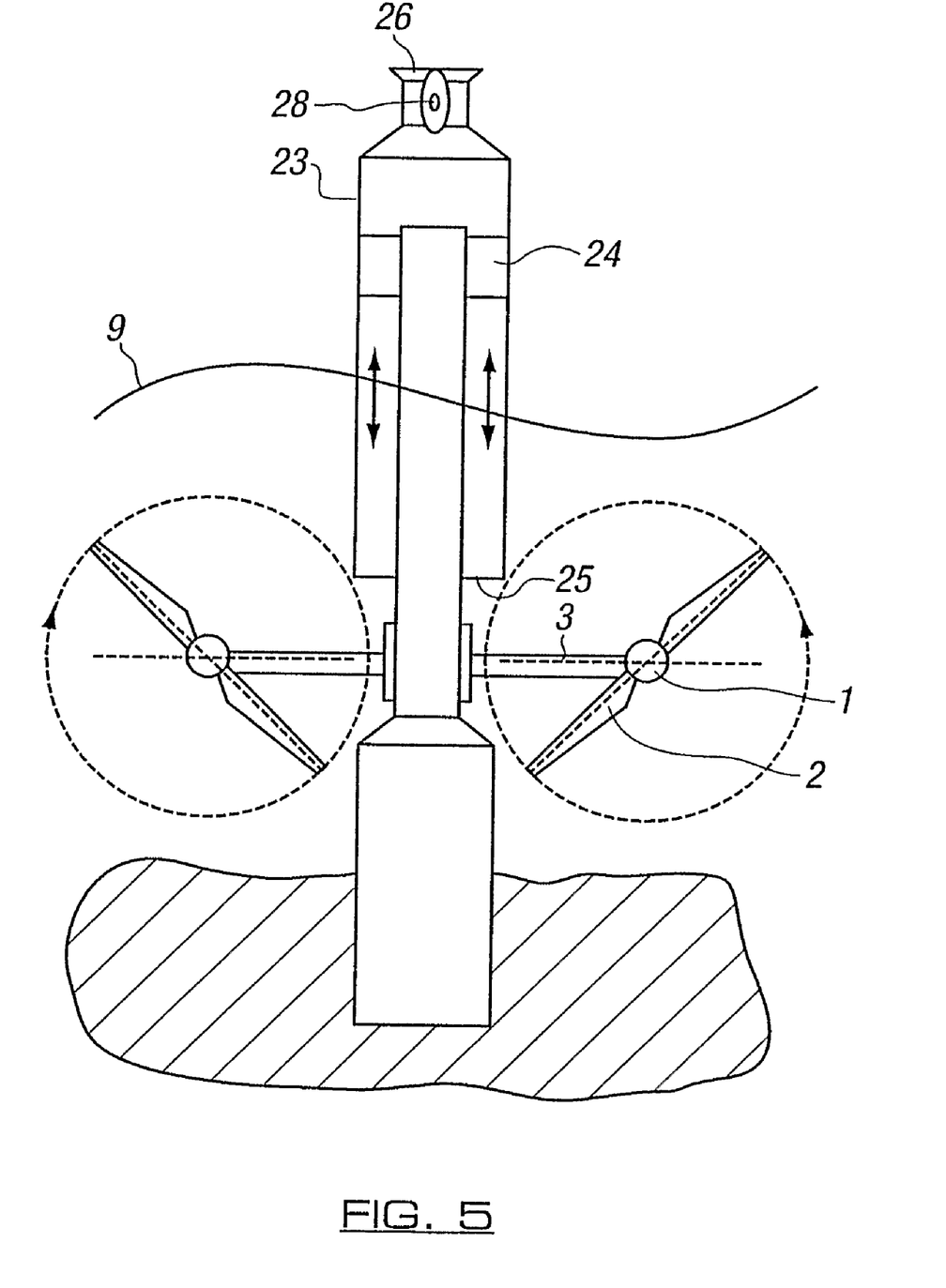
FIG. 5 schematically illustrates a fourth embodiment of a proposal for extracting energy from wave motion associated with a volume of water when combined with an installation/arrangement as represented by FIG. 1.

In alternative embodiments the arrangements for utilising the wave motion are located externally of the hollow support monopile structure 5 as is indicated in the embodiments of FIGS. 4 and 5.

Referring to FIG. 4 this Figure illustrates an alternative embodiment for absorbing wave energy integrated with the monopile mounted tidal turbine 1 of FIG. 1. In this example a large buoyant member 20 shown in the FIG. 4 as a doughnut or torroidal shaped float surrounding the monopile support structure 5, is driven up and down by passing waves and reacts this movement against the fixed monopile structure via, for example, hydraulic or pneumatic rams 21. The energy extracted in the form of pressurised hydraulic fluid or compressed air is used to supplement the power from the tidal turbines 1 possibly by driving an electricity generator located in the housing 10 located at the top of the monopile structure 5 and thus above water.

It should be noted that in general FIG. 4 illustrates the principle of attaching a float i.e., the member 20 to the fixed monopile structure such that said float may react against the monopile structure 5 and thereby generate useful energy. The embodiment illustrated is, by way of example, since other configurations of float may be used.

Furthermore, the mechanism for reacting the movement of the float relative to the support structure 5 need not necessarily be hydraulic or pneumatic rams, but could be a mechanical mechanism driving a generator or a directly driven electrical generating device.

Alternatively the output from the float could be in the form of pressurised fluid which may be transmitted some distance to where it may be applied for a practical purpose or which may be applied for such purposes as reverse osmosis desalination in close proximity to its source.

FIG. 5 shows another embodiment of an externally mounted device capable of extracting energy from passing waves through utilisation of yet another physical principle. In this example an air filled elongate chamber 23 is mounted mostly above the water level on the fixed monopile structure 5 used for the tidal turbine 1 described in relation to FIG. 1 such that it is partially submerged by extending below the water level. The chamber 23 is schematically illustrated as being maintained in position by mounting brackets 24. The chamber 23 is open at its base 25 so that it is flooded to the water level. As waves pass, the internal water level will rise and fall and in so doing it will act as a piston and drive air in the upper part of the chamber 23 in and out of a duct 26 open to atmosphere indicated at 27. In other words the passing waves will cause the chamber 23 to pull air in and then expel it through duct 26 due to the variations in internal water level caused by passing waves.

A device 28 known as a Wells Turbine (or some similar device capable of utilising a reciprocating flow of air) is driven by the air as it goes back and forth through the duct 26 and said Wells turbine 28 can generate electricity. This concept is known in the exploitation of wave energy and is generally known as an Oscillating Water Column Whilst the FIG. 5 illustrates the use of a single chamber circumscribing the hollow monopile support structure 5, such single chamber could be replaced by two or more smaller diameter chambers each being associated with its own Wells turbine whose outputs may be effectively serially or used in parallel.

From the forgoing it will be noted that the present invention resides in the combination of differing proposals for the extraction of energy extraction from moving water such as shown in FIGS. 1 to 5 involving combining a tidal or marine current energy driven turbines with wave responsive energy extraction devices and methods, using a fixed support structure at sea.

The manner in which the chamber is configured with respect to the support structure may be different from how it is illustrated in FIG. 5 and means other than a Wells Turbine may be used for converting the inhalation and exhalation of air to a usable energy form. It will be appreciated that FIG. 5 essentially illustrates an example of how this principle of the Oscillating Water Column might be combined with the support structure for tidal or marine current turbines.

It will be understood that the concepts of the invention enable a usable power generation installation for utilising power generated from a volume of non-static water, including a support structure upstanding within volume of water subject to the occurrence of both wave motion and tidal flow, means mounted from the support structure for deriving usable power from the tidal flow, means operationally supported relative to the support structure for deriving usable power from occurrence of wave motion independently from that derived from tidal flow and means for facilitating the transfer of such usable powers to a land based location. It should be added that with all these configurations means requires to be provided for ensuring that the tidal current turbines 1 can still be raised above the water surface for maintenance.

In some situations all or part of the wave energy devices will need to be removed 5 to permit the tidal turbine rotors to be raised. Details of how this may be achieved are not described since they are not considered to be essential to the understanding of this invention.

As has been explained in the forgoing description combinations of devices can generate electricity simultaneously or separately from both the kinetic energy of the passing currents and from the orbital kinetic energy inherent in wave motion.

The invention claimed is:

1. An energy conversion system for utilising power generated from a volume of non-static water, the system comprising:
a support structure upstanding within a body of water subject to the occurrence of both wave motion and tidal flow, wherein the support structure includes a hollow column;
one or more turbines arranged to be driven by the tidal flow for deriving usable power from the tidal flow and mounted for operation on the support structure, wherein said one or more turbines are arranged to be lengthways displaceable vertically or near vertically relative to the support structure between a submerged operating position and a position in which said one or more turbines project above a surface of the body of water;
a wave energy extraction device to extract energy from the wave motion and disposed substantially internally of the hollow column of the support structure, the wave energy extraction device operationally supported relative to the support structure for deriving usable power from the wave motion independently from that derived from the tidal flow; and
a transfer means for facilitating the transfer of such usable powers to a land based location, or for making some alternative use of such power elsewhere.

2. An energy conversion system as claimed in claim 1, wherein the wave energy extraction device includes pressure change means for producing changes in the pressure of air within at least one chamber mounted from the support structure in response to wave motion, and means responsive to such air pressure changes to produce usable energy.

3. An energy conversion system as claimed in claim 2, wherein the pressure change means comprises an oscillating water column and the means responsive to such air pressure changes to produce usable energy comprises a Wells Turbine.

4. An energy conversion system as claimed in claim 1, wherein each of said one or more turbines is configured to drive at least one generator, pump, compressor, or other means for utilising power derived by said turbine.

5. An energy conversion system as claimed in claim 1, further comprising a first power train configured to be driven by said one or more turbines and a second power train configured to be driven by said wave energy extraction device.

6. An energy conversion system as claimed in claim 1, further comprising a second wave energy extraction device disposed substantially externally of the hollow column of the support structure.

7. An energy conversion system for utilising power generated from a volume of non-static water, the system comprising:
a support structure upstanding within a body of water subject to the occurrence of both wave motion and tidal flow, wherein the support structure includes a hollow column;
one or more turbines arranged to be driven by tidal flow for deriving usable power from the tidal flow and mounted for operation on the support structure;
a wave energy extraction device arranged to extract energy from the wave motion for deriving usable power from the wave motion independently from that derived from the tidal flow and disposed substantially internally of the hollow column of the support structure, the wave energy extraction device comprising a resiliently loaded member lengthways displaceable relative to the hollow column, wherein the hollow column is adapted to allow entry therein of water serving to displace the resiliently loaded member in accordance with the wave motion in the vicinity of the hollow column; and
a transfer means for facilitating the transfer of the usable powers to a land based location, or for making some alternative use of such power elsewhere.

8. An energy conversion system as claimed in claim 7, wherein the resiliently loaded member carries a support means for supporting an additional device for deriving energy from the wave induced movements of the resiliently loaded member.

9. An energy conversion system as claimed in claim 7, wherein the resiliently loaded member comprises a resiliently loaded armature supported by a resilient mechanism and connected with a diaphragm further connected with the hollow column.

10. An energy conversion system as claimed in claim 7, wherein the resiliently loaded member comprises a piston member suspended from a resilient connection member.

11. An energy conversion system as claimed in claim 10, wherein the resiliently loaded member further comprises at least one permanent magnet mounted on the piston member and configured to pass through an electrical winding upon displacement by the wave motion to produce an electrical output current.

12. An energy conversion system for utilising power generated from a volume of non-static water, the system comprising:

a support structure upstanding within a body of water subject to the occurrence of both wave motion and tidal flow;

one or more turbines arranged to be driven by the tidal flow for deriving usable power from the tidal flow and mounted for operation on the support structure;

a wave energy extraction device to extract enemy from the wave motion, the wave energy extraction device operationally supported relative to the support structure for deriving usable power from the wave motion independently from that derived from the tidal flow and comprising a buoyant member externally surrounding a length of the support structure in such manner as to be lengthways displaceable of said length in accordance with the motion of passing waves and converting means for converting said movement into usable power by reacting said movement to the support structure; and a transfer means for facilitating the transfer of such usable powers to a land based location, or for making some alternative use of such power elsewhere.

* * * * *

UNITED STATES PATENT AND TRADEMARK OFFICE
CERTIFICATE OF CORRECTION

PATENT NO. : 7,948,107 B2
APPLICATION NO. : 12/089318
DATED : May 24, 2011
INVENTOR(S) : Peter L. Fraenkel Page 1 of 1

It is certified that error appears in the above-identified patent and that said Letters Patent is hereby corrected as shown below:

In the Claims

In Column 9, line 7, delete "enemy" and insert --energy--.

Signed and Sealed this
Twelfth Day of July, 2011

David J. Kappos
*Director of the United States Patent and Trademark Office*